Dec. 6, 1949 L. E. ASKE 2,490,021
ROTOR FOR PANCAKE TYPE INDUCTION MOTORS
Filed Nov. 21, 1946 4 Sheets-Sheet 1
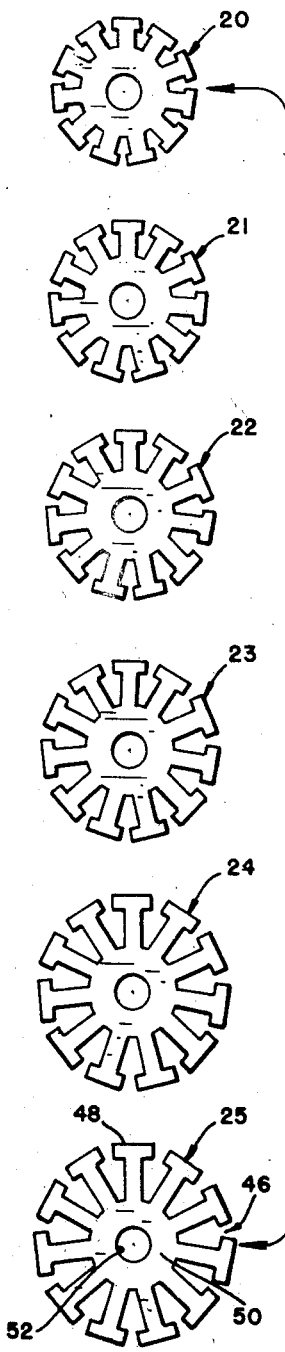
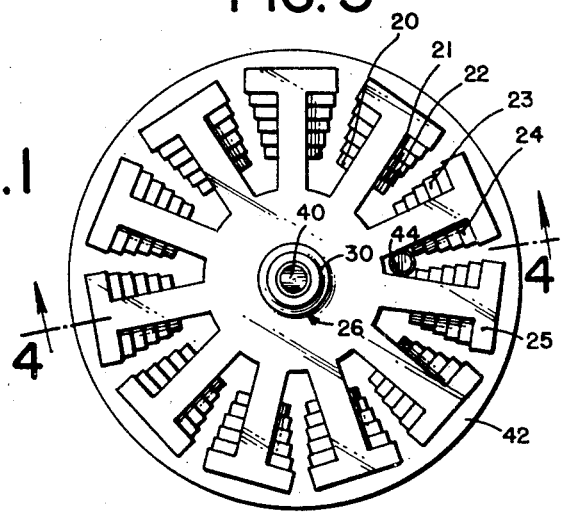
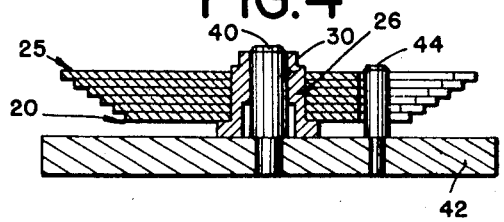
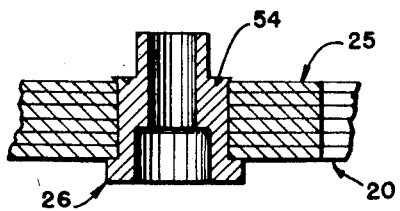
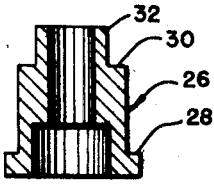
INVENTOR:-
LEONARD E. ASKE
BY Arthur R. Wylie
ATTY.

Dec. 6, 1949     L. E. ASKE     2,490,021
ROTOR FOR PANCAKE TYPE INDUCTION MOTORS
Filed Nov. 21, 1946     4 Sheets-Sheet 2

INVENTOR:-
LEONARD E. ASKE
BY Arthur R. Wylie
ATTY.

Dec. 6, 1949     L. E. ASKE     2,490,021
ROTOR FOR PANCAKE TYPE INDUCTION MOTORS
Filed Nov. 21, 1946     4 Sheets-Sheet 3
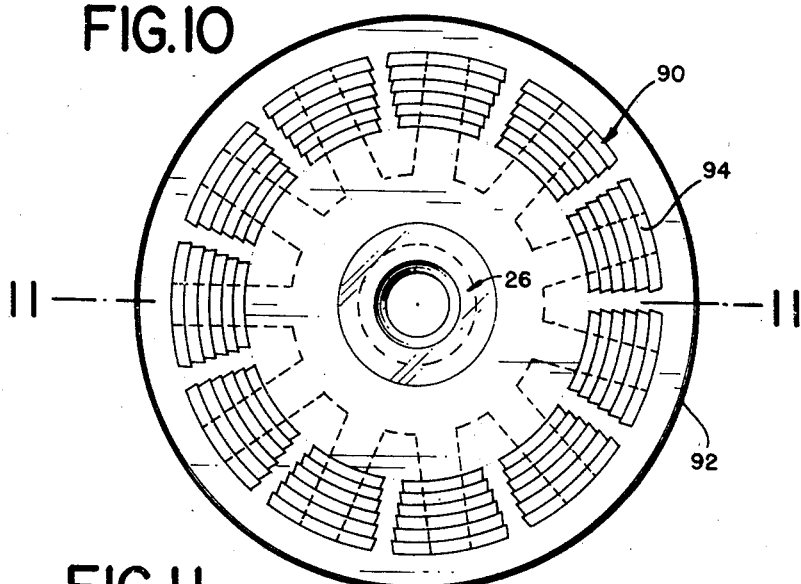
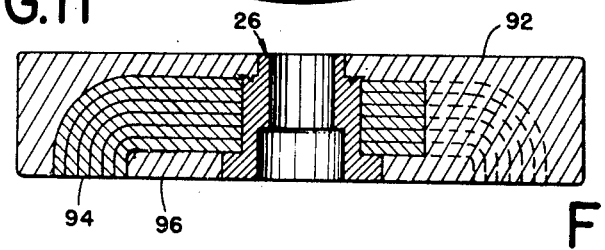
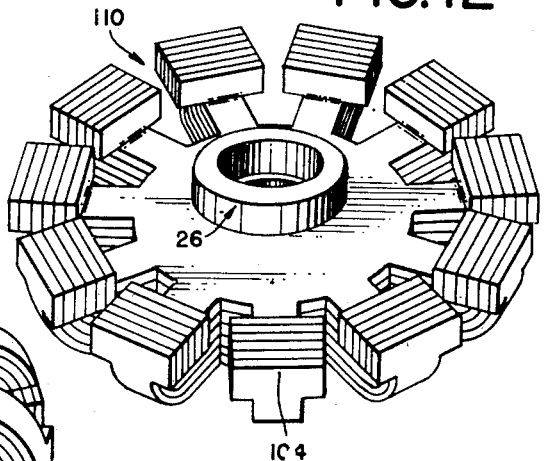
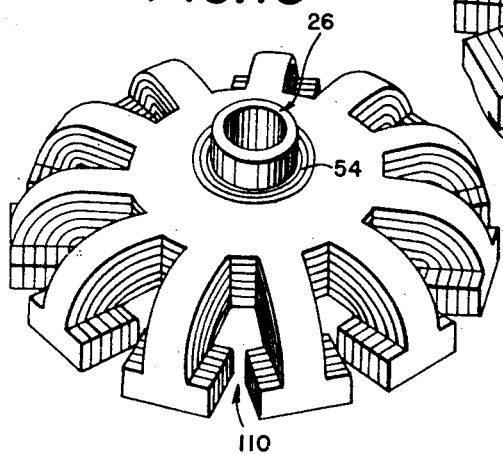
INVENTOR:-
LEONARD E. ASKE
BY Arthur R. Wylie ATTY.

Dec. 6, 1949          L. E. ASKE          2,490,021

ROTOR FOR PANCAKE TYPE INDUCTION MOTORS

Filed Nov. 21, 1946          4 Sheets-Sheet 4

INVENTOR:-
LEONARD E. ASKE
BY Arthur R. Wylie
ATTY.

Patented Dec. 6, 1949

2,490,021

UNITED STATES PATENT OFFICE 2,490,021

ROTOR FOR PANCAKE TYPE INDUCTION MOTORS

Leonard E. Aske, South Minneapolis, Minn., assignor to General Mills, Inc., a corporation of Delaware Application November 21, 1946, Serial No. 711,397

14 Claims. (Cl. 172—120)

1

This invention relates to rotors for pancake type motors and, particularly, those in which the core is made up of laminations.

An object of the invention is the provision of a laminated core for rotors for use in induction motors of the pancake type.

Another object is to provide a method of making rotors of this type.

These and other objects, as will hereinafter appear, are accomplished by this invention which is fully described in the following specification and shown in the accompanying drawings, in which Figure 1 is a disassembled view showing six laminations which, taken together, make up the core of the rotor;

Fig. 2 is an enlarged longitudinal section of a hollow rivet or hub used for assembling the laminations;

Fig. 3 is a top plan view of a jig for assembling the laminations on the hollow hub, with the laminations shown somewhat larger than those of Fig. 1;

Fig. 4 is a vertical section on the line 4—4 of Fig. 3;

Fig. 5 is an enlarged partial section showing the hollow hub staked to retain the laminations in place;

Fig. 10 is a bottom plan view showing the laminated rotor of Figs. 8 and 9 enclosed within a solid metal sheath as by casting;

Fig. 11 is a longitudinal view on the line 11—11 of Fig. 11;

Figs. 12 and 13 are similar to Figs. 8 and 9 except that the T-shaped leg portions instead of being made circular are made rectangular, presenting on their outer edges a polygonal form, and the airgaps between the teeth in this form are not of uniform width but increase in width as they go away from the center of the core;

2

Figure 14:
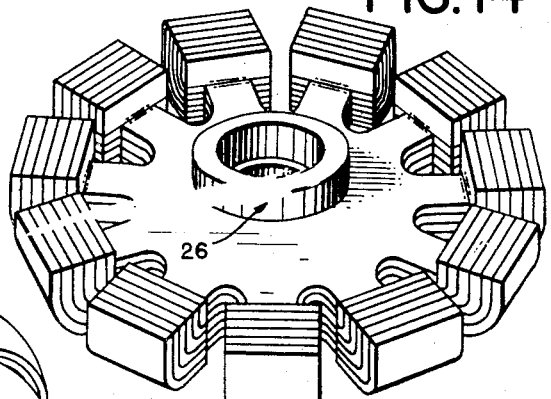
Figure 15:
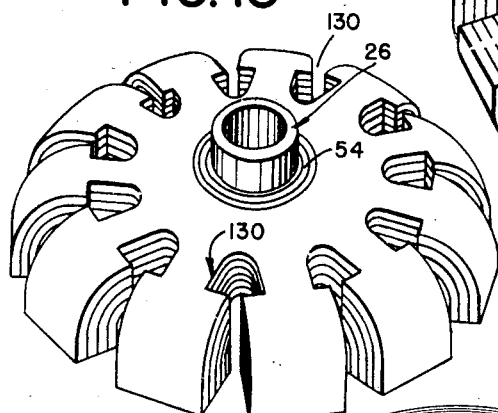
Figure 16:
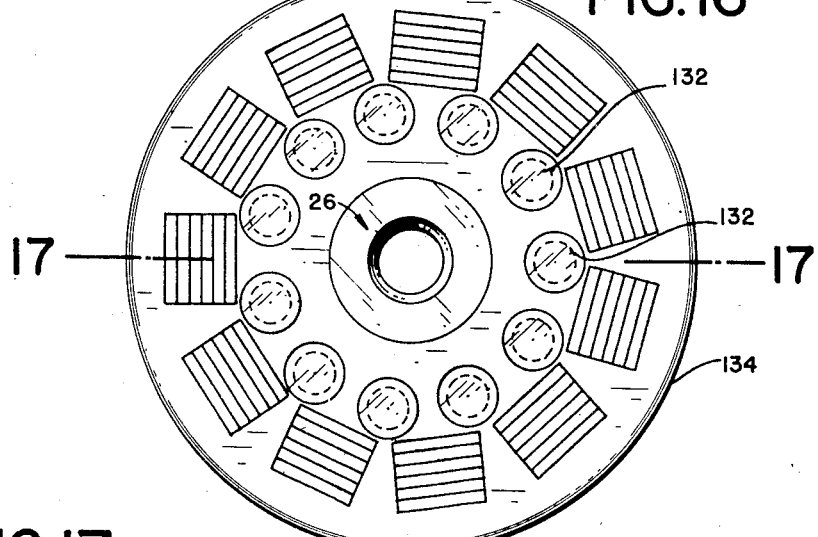
Figure 17:
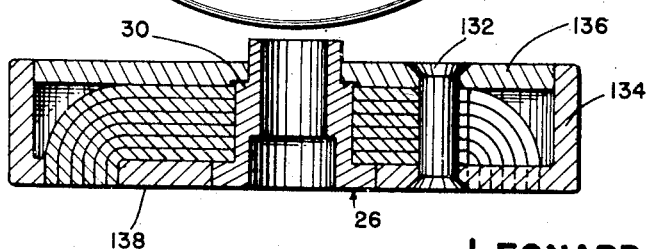

Figs. 14 and 15 are views similar to Figs. 8, 9, 12 and 13 except that the T-shaped leg portions are not of uniform depth as they were in the former figures;

Fig. 16 is a view similar to Fig. 10 but in which the laminated core is of the type shown in Figs. 14 and 15; and Fig. 17 is a longitudinal view of the line 17—17 of Fig. 16, the sheath in this case being made up of two members, one of which is cup-shaped and the other being a disk and fitting tightly into the cup-shaped member, and the two being preferably of copper and secured together by a series of copper rivets which extend through the core between the T-shaped legs.

The embodiment illustrated in Figs. 1 through 11 comprises an assemblage of laminations of increasing size as shown in Fig. 4, these laminations, for example 6 in number, being shown in elevation in Fig. 1. For the sake of convenience, these laminations are numbered 20, 21, 22, 23, 24 and 25 and are assembled in this order on a hollow hub 26 having shoulders 28 and 30, the laminations having central holes which snugly fit over the middle cylindrical portion of the hollow hub between the shoulders 28 and 30. Above the shoulder 30 is a reduced portion 32 which extends above the body of the rotor for a purpose which will presently be explained.

For the sake of assembly, the hollow hub 26 is snugly fitted over a locating pin 40 on a base 42 of a jig which carries a guide rod 44.

The laminations of Fig. 1 are sheared from electric silicon sheet steel with portions shaped like an enlarged T 46, being punched from the outer portion of each disk which gives a polygonal periphery to form T-shaped portions 48 and leaving central hubs 50 which, together with the circular hole 52, are substantially similar for all sizes of laminations.

In the forms shown in Figs. 1 through 11, the length of the top portion of enlarged T increases in width from laminations 20 through 25. After the several laminations are assembled on the cylindrical central portion of the hollow hub 26, as shown in Fig. 4, the shoulder 30 is "staked" as shown at 54, Fig. 5, so as to cause some of the metal to flow out over the edge of the outer lamination 25, thereby firmly clamping all the laminations together, the rod 44 serving to position all of them in register.

Figure 6:
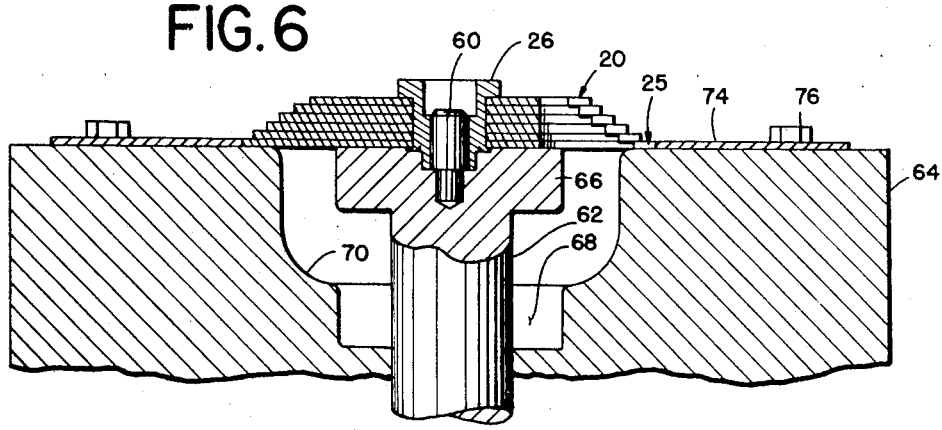
Fig. 6 is a partial vertical section through a die for bending up the T-shaped teeth on radial spokes on the core laminations to form a large, nearly rectangular tooth body.

The rotor core body so assembled is then withdrawn from the pin 40 and after being inverted is assembled, as shown in Fig. 6, on a locating pin 60, on a plunger 62, which is movable up and down in a frame 64 of a forming die. A spring, not shown, urges the plunger 62 upward until it comes to rest against a stop (not shown) in the position shown in Fig. 6 in which the top of the plunger is even with the top of the die body. As this plunger is forced downward, as will presently be described, a head 66 fits into an opening 68 in the top of the forming die body. Above the opening 68 the die is rounded at 70 to provide the necessary roundness to the spokes of the respective laminations, as will later be described. The head 66 is just deep enough to fill the opening 68 when the plunger is depressed, the top of the head then being even with the rounded portion 70. Above the frame 64 of the forming die is located a nest plate 74 which serves to position the group of laminations comprising the rotor core, and this plate is secured by a series of cap screws and the like 76.

Figure 7:
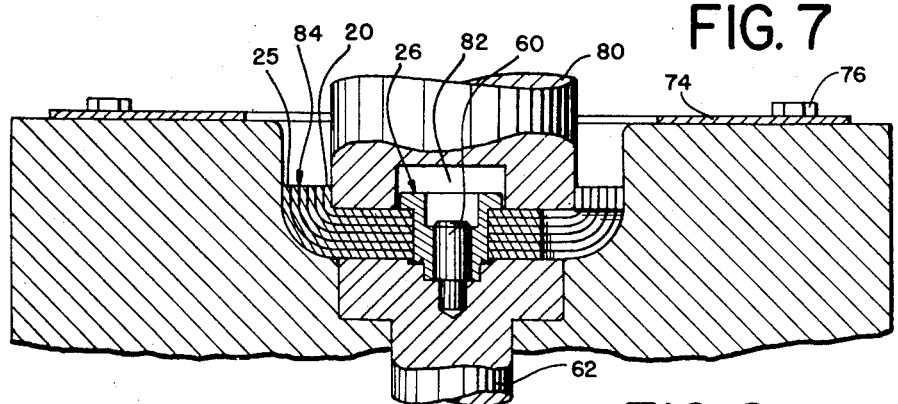
Fig. 7 is a similar view showing the plunger in the down position, completing the forming of the teeth on the laminations.

Above the center of the plunger and located axially therewith is a forming punch 80 which has an opening 82 fitting over the flange on the hollow hub 26. The lower edge of this die is slightly rounded so that as the punch descends into the die the outer ends of the spoked T-shaped legs are pressed up into the form shown generally at 84 in Figs. 7 and 8. If the die for forming the several laminations is properly proportioned with respect to the thickness of the laminated sheets, the tooth faces or edges of the several laminations should be substantially on the same horizontal level as is shown in Figs. 7 and 8, the smaller lamination 20 being at the center and the larger lamination 25 being at the outside.

Figure 8:
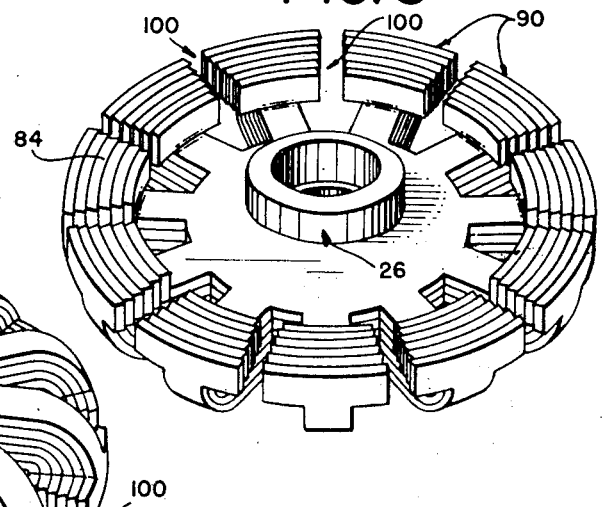
Figs. 8 and 9 are enlarged perspectives of the assembled and formed laminated cores showing the T-shaped leg portions respectively turned up, and the same with the T-shaped leg portions turned down, the T-shaped leg portions in both of these cases being made circular and the airgaps between the T-shaped legs being substantially uniform throughout.

As the die 80 is removed, the spring (not shown) forces the plunger 62 up to the position shown at Fig. 6 with the laminated rotor core as shown in Fig. 8 lying on top of it and still centrally located on the pin 60. The operator then withdraws the finished rotor core 90 which is shown in two positions in Figs. 8 and 9.

The formed laminated rotor core must now be face-machined or ground truly square with the mounting hub 26 to make the tooth area flat and square.

Before casting this face-machined rotor, it is necessary to remove all grease, dirt and the like. The rotor core can now be electro-plated, preferably with nickel or the like, to prevent oxidation of the exposed steel tooth area. This plating of the core smooths the exposed surfaces and is also a wetting agent for the molten aluminum.

To achieve good results in permanent mold casting aluminum around a steel body, it is very important to have the steel insert very clean and very dry so that there will be no trapping of air, vapor or gas when the molten aluminum wets the surfaces of the inserted body.

In Figs. 10 and 11, this laminated rotor core is shown cast in a suitable metal such as aluminum, copper, or certain of their alloys which have high electrical conductivity. This cast metal sheath 92 completely encloses the core except for the tooth faces 94 which are preferably on the level of the corresponding face 96 of the sheath.

In Figs. 12 and 13, is shown a modified form of the rotor core in which the enlarged T-shaped teeth 104 are straight and perpendicular to a line drawn through the axis of the rotor core and through the center of these teeth. This differs from the form shown in Fig. 8 in which the enlarged T-shaped teeth are preferably formed with their outer edges lying in a circle, described about the axis of the rotor core.

Figure 9:
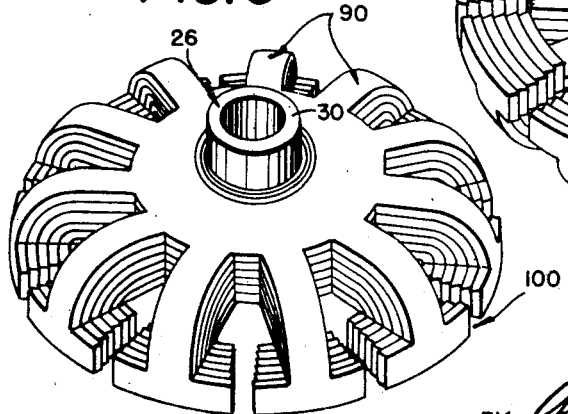

It will also be observed that in Figs. 8 and 9 the airgaps 100 between the enlarged T-shaped leg portions are of substantially the same width throughout whereas the airgaps 110 of the form shown in Figs. 12 and 13 are not of the same width but increase with distance from the axis of the rotor core. The form shown in Figs. 8 and 9 is in these two respects preferable to that shown in Figs. 12 and 13.

In Figs. 14 through 17 is shown still another modification of the invention in which the depth of the enlarged T-shaped bent-up portions of the teeth is not uniform as in Figs. 8 and 9, but varies with each lamination. In this case, the opening 130 between the T-shaped portions remains constant and is adapted particularly for the insertion of copper rivets 132 which, as shown in Figs. 16 and 17, serve to connect the copper cup-like member 134 with a tightly-fitting copper cover 136 which is counter-bored and rests on the shoulder 30 of the staked portion of the hollow hub, while the central portion of the cup 134 bears against the central portion of the innermost lamination. When these copper members are pressed into place, tight joints ensue between these rivets and the cup and cover with the result that good electrical conductivity is obtained. Even then, it is well to machine the face 138 of the finished rotor to insure that it runs uniformly concentric and has a plane surface. It is now solder-dipped for good electrical contact and electro-plated to prevent oxidation.

The method described in the foregoing specification is claimed in applicant's co-pending application, Serial No. 64,894, filed December 11, 1948, Method of making rotors for axial pole motors.

While I have shown and described but a few embodiments of my invention, it is to be understood that it is capable of many modifications. Changes, therefore, may be made which do not depart from the spirit and scope of my invention as disclosed in the appended claims.

I claim as my invention:

1. A rotor for motors of the pancake type, comprising a core made up of a series of steel laminations secured together at their centers and having spaced outwardly extending teeth curved concentrically to one side and terminating in a common plane normal to its axis, and a metal sheath of high electrical conductivity substantially enclosing said core except at the teeth, portions of the metal extending through between the teeth from one side to the other of said metal sheath to complete electrical circuits in said sheath.

2. A rotor for motors of the pancake type comprising a core made up of a series of steel laminations secured together at their centers and having spaced outwardly extending teeth curved concentrically to one side at substantially 90° with the teeth of all the laminations terminating in a common plane normal to the rotor axis, and a metal sheath of high electrical conductivity substantially enclosing said core except at the teeth, portions of the metal extending through between the teeth from one side to the other of said metal sheath to complete electrical circuits in said sheath.

3. A rotor for motors of the pancake type comprising a core made up of a series of steel laminations secured together at their centers and having spaced outwardly extending teeth curved concentrically to one side, and terminating in a plane normal to its axis, and a metal sheath of high electrical conductivity substantially enclosing said core except at the teeth, portions of the metal extending through between the teeth from one side to the other of said metal to complete electrical circuits in said sheath, one face of the metal sheath and the faces of all the teeth lying in a common plane.

4. A rotor for motors of the pancake type comprising a core made up of a series of steel laminations secured together at their centers and having spaced outwardly extending teeth curved concentrically to one side and terminating in a plane normal to its axis, and a metal sheath of high electrical conductivity substantially enclosing said core except at the teeth, portions of the metal extending through between the teeth from one side to the other of said metal sheath to complete electrical circuits in said sheath, the sides of adjacent teeth being parallel.

5. A rotor for motors of the pancake type comprising a core made up of a series of steel laminations secured together at their centers and having spaced outwardly extending teeth curved concentrically to one side, and terminating in a plane normal to its axis, and a metal sheath of high electrical conductivity substantially enclosing said core except at the teeth, portions of the metal extending through between the teeth from one side to the other of said metal sheath to complete electrical circuits in said sheath, the airgap between adjacent faces being of uniform width throughout.

6. A rotor for motors of the pancake type comprising a core made up of a series of steel laminations secured together at their centers and having spaced outwardly extending teeth curved concentrically to one side and terminating in a plane normal to its axis, and a metal sheath of high electrical conductivity substantially enclosing said core except at the teeth, metal rivets extending through between the teeth from one side to the other of said metal sheath to complete electrical circuits in said sheath, the metal rivets being located inside the teeth which are of substantially the same thickness as the core.

7. A rotor for motors of the pancake type comprising a core made up of a series of steel laminations secured together at their centers and having spaced outwardly extending teeth curved concentrically to one side and terminating in a plane normal to its axis and spaced some distance away from the center of the inner lamination, and a metal sheath of high electrical conductivity substantially enclosing said core except at the teeth, portions of the metal extending through between the teeth from one side to the other of said metal sheath to complete electrical circuits in said sheath.

8. A rotor for motors of the pancake type comprising a core made up of a series of steel laminations secured together at their centers and having spaced outwardly extending teeth curved concentrically to one side and terminating in a plane normal to its axis, the depth of the overhanging tooth faces being the same throughout, and a cast metal sheath of high electrical conductivity substantially enclosing said core except at the teeth, portions of the metal extending through between the teeth from one side to the other of said metal sheath to complete electrical circuits in said sheath, the face of the metal and the faces of the teeth lying in a common plane.

9. A rotor for motors of the pancake type comprising a core made up of a series of steel laminations secured together at their centers and having spaced outwardly extending teeth curved concentrically to one side and terminating in a plane normal to its axis, the depth of the overhanging tooth faces varying with the distance from the axis, and a cast metal sheath of high electrical conductivity substantially enclosing said core except at the teeth, portions of the metal extending through between the teeth from one side to the other of said metal sheath to complete electrical circuits in said sheath, the face of the metal and the faces of the teeth being machined to a plane.

10. A rotor for motors of the pancake type, comprising a series of coaxial dished laminations of similar shape and of correspondingly decreasing diameter and depth nested one within the other in order of decreasing size, each lamination including a central portion in a plane perpendicular to the axis of rotation of the rotor and a peripheral edge portion provided with notches forming spaced teeth, the notches of the respective laminations being aligned to provide air gaps between groups of adjacent teeth and the edges of the teeth lying substantially in a common plane perpendicular to the axis.

11. A rotor for motors of the pancake type, comprising a series of coaxial dished laminations of similar shape and of decreasing diameter and depth nested one within the other in order of decreasing size, each lamination including a central portion in a plane perpendicular to the axis of rotation of the rotor and a peripheral edge portion provided with notches forming spaced teeth.

12. A rotor for motors of the pancake type, comprising a series of coaxial dished laminations of similar shape and of decreasing diameter and depth nested one within the other in order of decreasing size, each lamination including a peripheral edge portion having notches forming spaced teeth, the edges of corresponding teeth lying in a plane intersecting the axis of rotation of said rotor.

13. A rotor for motors of the pancake type, comprising a series of coaxial dished laminations of similar shape and of decreasing diameter and depth nested one within the other in order of decreasing size.

14. A rotor for motors of the pancake type, comprising a series of coaxial dished laminations of similar shape and of decreasing diameter and depth nested one within the other in order of decreasing size, each lamination including a central portion in a plane perpendicular to the axis of rotation of the rotor and a substantially cylindrical edge portion provided with notches forming spaced teeth.

LEONARD E. ASKE.

REFERENCES CITED

The following references are of record in the file of this patent:

UNITED STATES PATENTS

| Number | Name | Date |
|---|---|---|
| 1,190,054 | Wiard | July 4, 1916 |
| 1,255,606 | Hensley | Feb. 5, 1918 |
| 1,551,271 | Selpian | Aug. 25, 1925 |
| 1,762,017 | Grenzer | June 3, 1930 |
| 1,807,001 | Methlin | May 26, 1931 |
| 1,897,184 | Zopp | Feb. 14, 1933 |
| 1,991,046 | Bohli | Feb. 12, 1935 |
| 2,243,318 | Rawlings | May 27, 1941 |
| 2,246,777 | Bordeaux et al. | June 24, 1941 |
| 2,356,784 | Graham | Aug. 29, 1944 |